Sept. 21, 1937.  C. A. WILD ET AL  2,093,594
PISTON
Filed March 9, 1936     2 Sheets-Sheet 1

Fig.1ᵃ.

INVENTORS
C.A. WILD
A. MONKHOUSE
W. MONKHOUSE
BY
J. Owden O'Brien
ATTORNEY.

Sept. 21, 1937.  C. A. WILD ET AL  2,093,594

PISTON

Filed March 9, 1936  2 Sheets-Sheet 2

INVENTORS
C. A. WILD
A. MONKHOUSE
W. MONKHOUSE
BY
Lowden O'Brien
ATTORNEY

Patented Sept. 21, 1937

2,093,594

UNITED STATES PATENT OFFICE 2,093,594

PISTON

Clement Arthur Wild, Albert Monkhouse, and William Monkhouse, Oldham, England

Application March 9, 1936, Serial No. 67,794
In Great Britain March 30, 1935

2 Claims. (Cl. 309—16)

This invention relates to improvements in pistons for internal combustion engines, steam engines, pumps and the like of the type in which the piston is constructed in two parts, an inner member carrying the gudgeon pin and an outer cylindrical member carrying the piston rings the two members being connected together by screws passing through the top of the outer member into the inner member so that during normal running of the engine or pump the two members will reciprocate as one but when it is desired to remove the piston from the cylinder they can be detached and the outer cylindrical part drawn out of the cylinder leaving the inner cylindrical member therein thus allowing the surface of the piston which contacts with the surface of the cylinder to be withdrawn without it being necessary to remove the whole cylinder block, the oil sump and the big ends as is usually the case with the engines of motor vehicles.

In pistons of the aforesaid type there is the possibility of the attaching screws becoming loose and damaging the cylinder head and the present invention consists in providing a plate above the screws which will cover the heads thereof after they have been inserted and prevent them from working loose.

Another feature of the invention consists in so attaching the outer cylindrical member of the piston to the inner member thereof that although longitudinal movement between the two members is prevented the outer member is capable of a rotary movement relative to the inner member. Such rotary movement is very small for each stroke of the piston but it ensures more even wear of the cylinder walls and also of the piston rings carried by the outer member of the piston.

The invention will be described with reference to the accompanying drawings in which:—

Fig. 1a is an elevation of a tool which can be employed for withdrawing the outer cylindrical member from the inner member after the attaching screws have been withdrawn.

Figure 1:
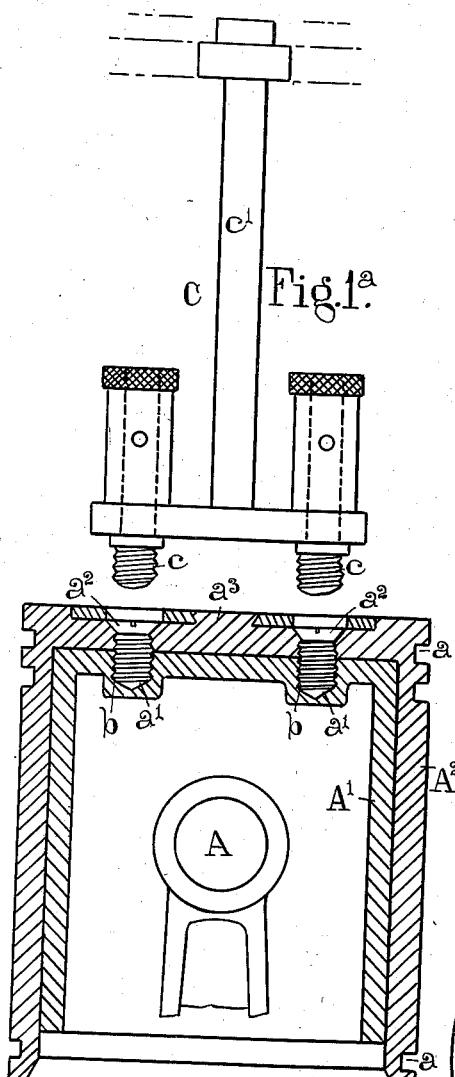
Fig. 1 is a vertical section of one form of the invention.
Figure 3:
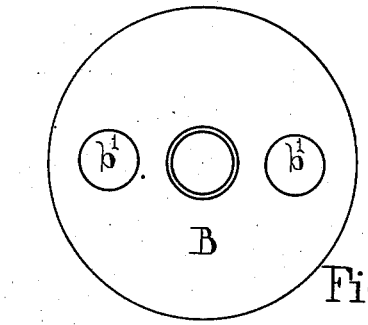
Fig. 3 is a plan of the cover plate for preventing movement of the screws affixing the two members together.
Figure 4:
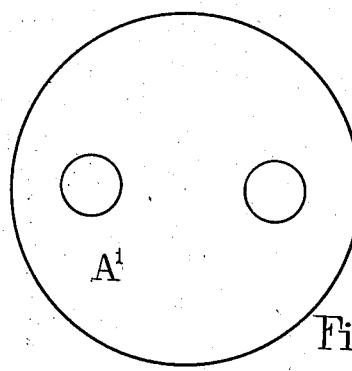
Fig. 4 is a plan of the inner cylindrical member.
Figure 2:
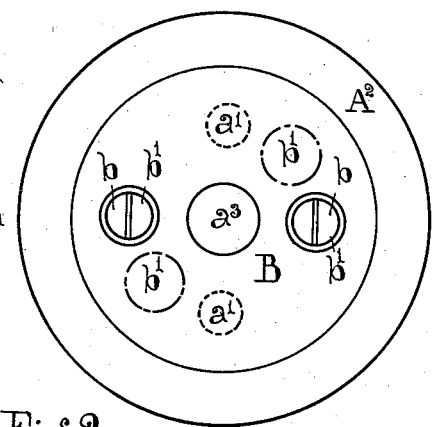
Fig. 2 is a plan of the same.

In the form of the invention shown in Figs. 1 to 4 the piston is formed in two parts, an inner member $A^1$ which carries the gudgeon pin A and an outer cylindrical member $A^2$ in which the annular grooves $a$ to receive the piston rings are formed. The top of the inner member $A^1$ is provided with four equally spaced screwed holes $a^1$ and the outer member $A^2$ is constructed to fit over the member $A^1$ and is provided with two or more countersunk holes $a^2$ adapted to coincide with either of the diametrically opposite pairs of holes $a^1$ in the inner member $A^1$. The two members $A^1$ and $A^2$ can thus be secured together by two or more screws $b$ passing through the holes $a^2$ in the outer member and screwed into the holes $a^1$ in the top of the inner member.

To prevent the screws $b$ from working loose a cover plate B is arranged in an annular groove in the top of the outer member $A^2$, such plate being capable of rotation about a central pivot $a^3$. The plate B is formed with two diametrically opposite holes $b^1$ to give access to the heads of the screws $b$ but by rotating the plate about the pivot $a^3$ to bring the holes $b^1$ into the position shown in long and short dots in Fig. 3 the heads of the screws $b$ will be covered and the latter prevented from working loose. The provision of two pairs of holes $a^1$ in the top of the inner member $A^1$ allows the angular position of the outer member $A^2$ to be varied in relation to the inner member $A^1$ and the cylinder walls.

When it is desired to withdraw the outer member $A^2$ from the cylinder the plate B is rotated until the heads of the screws $b$ are exposed and the screws $b$ removed by a screwdriver. The outer member $A^2$ is then withdrawn by a suitable tool such as the tool C illustrated in Fig. 1a which comprises two members $c$ adapted to be screwed into the holes $a^2$ in the top of the member $A^2$ and a central stem $c^1$ by which the tool and member can be withdrawn vertically from the inner member $A^1$.

Figure 5:
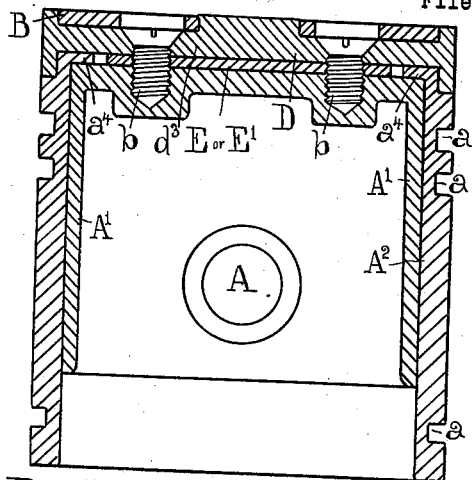
Fig. 5 is a vertical section of another form of the invention in which the outer cylindrical member can be arranged either to be capable of rotation relative to the inner member or be prevented from such movement, in either case longitudinal movement between the two members being restricted.
Figure 6:
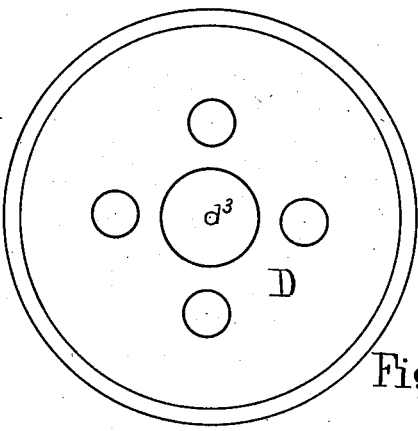
Fig. 6 is a plan of the cap forming the top of the outer member.
Figure 8:
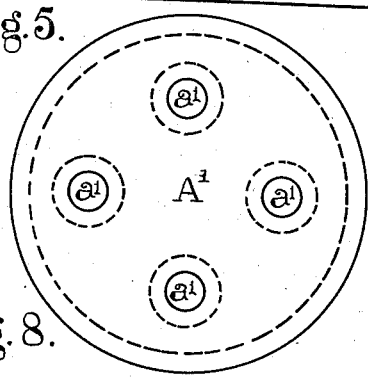
Fig. 8 is a plan of the inner member.
Figure 7:
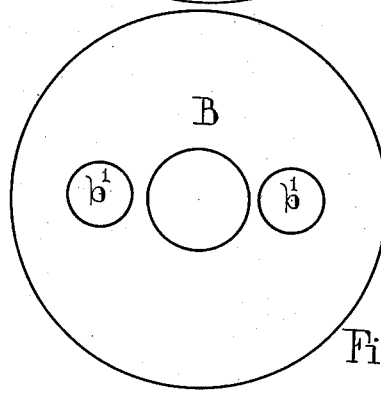
Fig. 7 is a plan of the cover plate serving to prevent the attaching screws from working loose.
Figure 9:
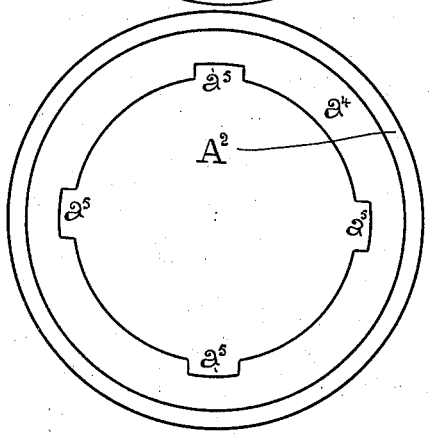
Fig. 9 is a plan of the outer member.
Figure 11:
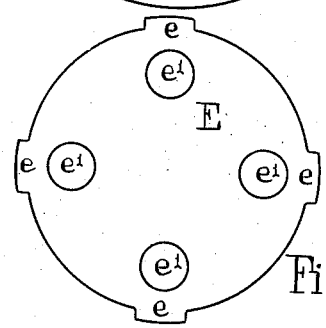
Fig. 11 is a plan of the plate inserted between the top of the inner member and the cap forming the top of the outer member when it is desired that the outer member should be prevented from rotation relative to the inner member.
Figure 10:
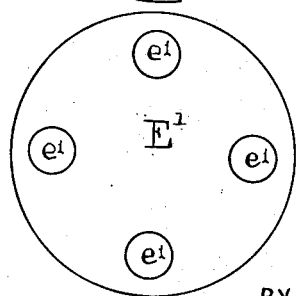
Fig. 10 is a plan of the plate inserted between the top of the inner member and the cap forming the top of the outer member when it is desired that the outer members should be capable of rotation relative to the inner member.

In the form of the invention shown in Figs. 5 to 11 the top of the inner member $A^1$ is formed with four equally spaced screwed holes $a^1$ and the outer member $A^2$ is formed with a circumferential flange $a^4$ which surrounds the top of the member $A^1$. A cap D covers the top of the member $A^2$ and is secured to the inner member $A^1$ by two or more screws $b$ which are screwed into the holes $a^1$ in the member $A^1$. To prevent the screws $b$ from working loose a cover plate B is arranged in an annular groove in the top of the cap D such plate being capable of rotation about a central pivot $d^3$. The plate B is formed with two diametrically opposite holes $b^1$ to give access to the heads of the screws $b$ but by rotating the plate about the pivot $d^3$ the plate B can be brought into a position to cover the heads of the screws $b$ and prevent them from working loose.

The circumferential flange $a^4$ on the outer member $A^2$ is formed with four or other number of recesses $a^5$ and when it is desired that there should be no rotary movement between the members $A^1$ and $A^2$ a plate E (see Fig. 11) having projections $e$ to engage in the recesses $a^5$ is inserted between the top of the inner member $A^1$ and the cap D. The plate E is provided with holes $e^1$ for the passage of the screws $b$. The outer member $A^2$ is thus locked to the plate E by the projections $e$ and the plate E is affixed to the cap D and to the member $A^1$ by the screws $b$ whereby any rotary movement of the member $A^2$ in relation to the member $A^1$ is prevented.

When it is desired that the outer member $A^2$ should be capable of rotation in relation to the inner member $A^1$, the plate E is replaced by a plate $E^1$ (see Fig. 10) without lateral projections but provided with holes $e^1$ for the screws $b$. In this case the member $A^2$ is not locked to the plate $E^1$ and is therefore capable of rotation in relation thereto and to the inner member $A^1$.

The plate E is of the same depth as the flange $a^4$ on the outer member $A^2$ so that when the cap D is affixed by the screws $b$ a tight joint is formed between the cap and the outer member, but the plate $E^1$ is slightly less deep than the flange $a^4$ to allow of relative rotation between the members $A^2$ and $A^1$.

In all the forms of the invention grooves may be formed either in the outer surface of the inner member or in the inner surface of the outer member for supplying oil to lubricate the surfaces.

Moreover, in all the forms of the invention the inner member $A^1$ is preferably made shorter than the outer member $A^2$ to lighten the weight of the piston, and the latter may be further lightened by cutting away part of the inner wall of the outer member or of the wall of the inner member.

What we claim as our invention and desire to protect by Letters Patent is:—

1. A piston of the type referred to comprising the combination with an inner member carrying a gudgeon pin, an open ended outer member carrying piston rings and screws holding the two members together, of a flanged cap formed with an annular groove in its upper surface closing the outer member, a circular plate intermediate of the flanged cap and the upper surface of the inner member through which the holding screws pass from the cap to the inner member, a central pivot formed on the upper surface of the cap, centrally disposed with respect to the annular groove and an annular plate having a series of holes therein located in said groove and rotatable about said pivot to cover the screws affixing the cap to the inner member and holding the outer member between them, rotation of the annular plate bringing the holes therein into register with the heads of the attaching screws for the insertion or withdrawal thereof.

2. A piston of the type referred to comprising the combination with an inner member carrying a gudgeon pin, an open ended outer member carrying piston rings and screws holding the two members together, of a flanged cap formed with an annular groove in its upper surface closing the outer member, a circular plate intermediate of the flanged cap and the upper surface of the inner member through which the holding screws pass from the cap to the inner member, means on the intermediate plate to lock the outer member thereto and prevent its rotation, a central pivot formed on the upper surface of the cap centrally disposed with respect to the annular groove and an annular plate having a series of holes therein located in said groove and rotatable about said pivot to cover the screws affixing the cap to the inner member and holding the outer member between them, rotation of the annular plate bringing the holes therein into register with the heads of the attaching screws for the insertion or withdrawal thereof.

CLEMENT ARTHUR WILD.
ALBERT MONKHOUSE.
WILLIAM MONKHOUSE.